United States Patent [19]

Vancha

[11] 4,326,273
[45] Apr. 20, 1982

[54] ULTRASONIC RANGING DEVICE

[75] Inventor: John Vancha, Bolingbrook, Ill.

[73] Assignee: Hurst Performance, Inc., Warminster, Pa.

[21] Appl. No.: 171,529

[22] Filed: Jul. 23, 1980

[51] Int. Cl.³ .................... G01S 15/93; G01S 15/18
[52] U.S. Cl. ............................. 367/112; 367/116; 367/137; 367/909
[58] Field of Search .............. 367/112, 116, 903, 909, 367/137

[56] References Cited

U.S. PATENT DOCUMENTS

| | | | |
|---|---|---|---|
| 3,030,608 | 4/1962 | Polster | 367/101 X |
| 3,042,303 | 7/1962 | Kendall et al. | 367/93 X |
| 3,046,519 | 7/1962 | Polster | 367/93 X |
| 3,255,434 | 6/1966 | Schwarz | 367/96 X |
| 3,360,775 | 12/1967 | Schroeder | 367/112 X |
| 3,435,406 | 3/1969 | McCauley | 367/93 |
| 3,613,068 | 10/1971 | Thompson et al. | 367/903 X |
| 3,675,190 | 7/1972 | Aver, Jr. et al. | 367/903 X |
| 3,732,555 | 5/1973 | Strenglein | 367/112 X |
| 3,740,705 | 6/1973 | Lowrance | 367/112 |
| 3,741,655 | 6/1973 | Ling et al. | 356/5 |
| 3,806,861 | 4/1974 | Okumura et al. | 367/909 X |
| 3,842,397 | 10/1974 | Sindle | 367/112 X |
| 3,863,196 | 1/1975 | Hilles | 367/96 |
| 3,900,261 | 8/1975 | Wingate | 356/5 |
| 3,922,629 | 11/1975 | Hayakawa | 367/112 X |
| 3,938,071 | 2/1976 | Berger et al. | 367/137 |

FOREIGN PATENT DOCUMENTS 1509756  5/1978  United Kingdom .

Primary Examiner—Richard A. Farley
Attorney, Agent, or Firm—George R. Clark; Neil M. Rose; Robert J. Fox

[57] ABSTRACT

An ultrasonic ranging device for use in a vehicle having a high frequency oscillator supplying continuous sine wave signals to a power amplifier through a first gate controlled by a timer. A second gate controlled by the timer supplies an amplified sine wave signal from the power amplifier to a piezoelectric transducer mounted on an exterior portion of a vehicle. The transducer produces a series of repeated ultrasonic pulses and receives echoes from nearby objects converting the echoes into electrical return signals. A receiver amplifies the return signals and supplies them to a coincidence gate, which is enabled for relatively short time intervals by a timer. The coincidence gate supplies an output signal to an indicator when the return signal is detected during the interval that the gate is enabled.

6 Claims, 4 Drawing Figures

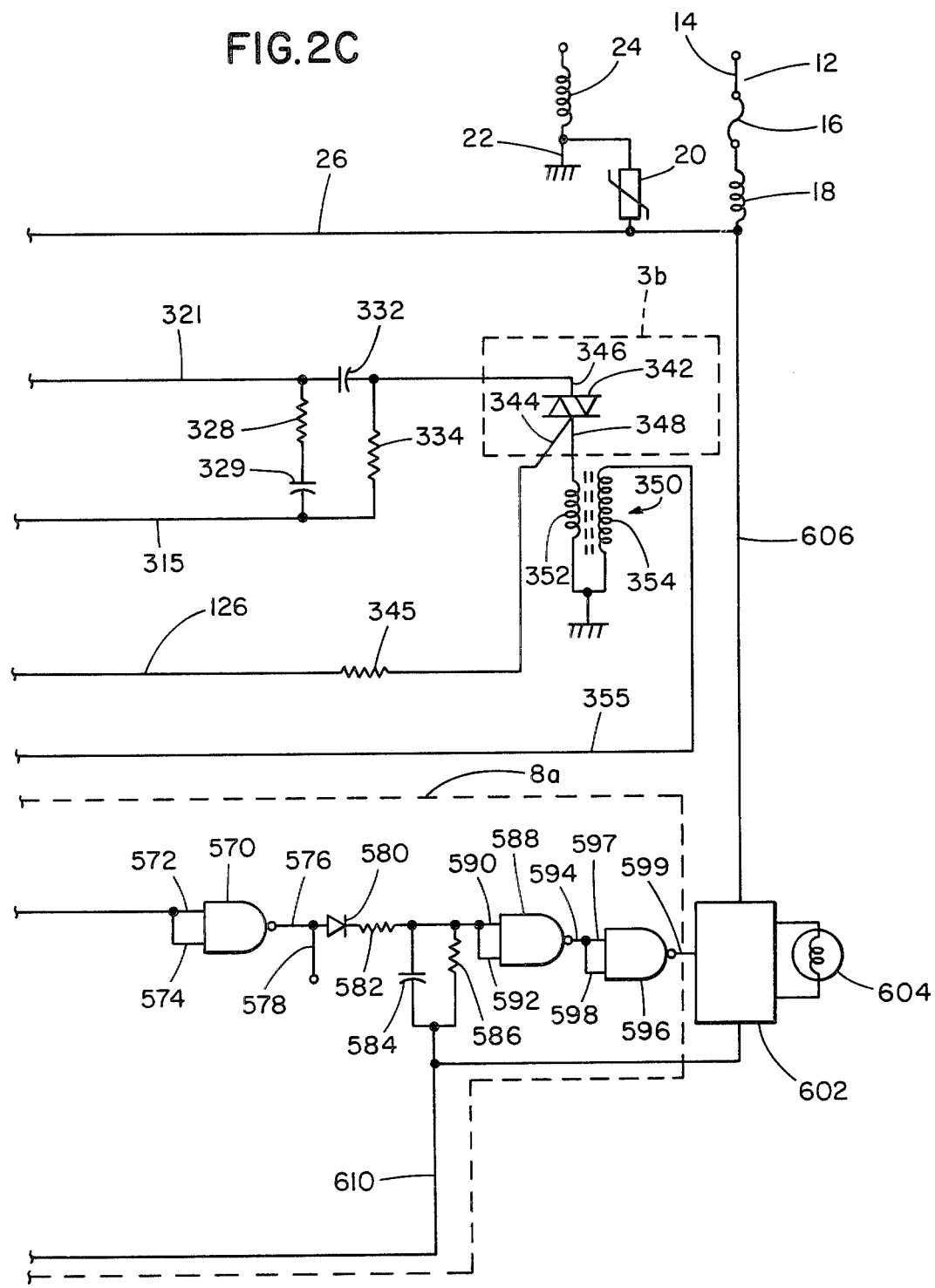

ULTRASONIC RANGING DEVICE

BACKGROUND OF THE INVENTION

Although the prior art teaches a number of sonar or ultrasonic ranging devices, typical of which is that shown in U.S. Pat. No. 3,360,775 to Schroeder, and U.S. Pat. No. 3,922,629 to Hayakawa, there do not appear to be any prior art ultrasonic ranging devices specifically adapted for use by most drivers of passenger vehicles.

It is clear that the advantages to be obtained from such a device are many. For instance, the ranging device can be used as a warning system for a person backing a car. Oftentimes, a person may not step out of the car to look behind it before he backs up or may only take a quick glance in the rear view mirror. Children are often injured or killed by drivers backing down driveways. Most people are also familar with persons unlucky enough to strike objects, such as posts, while parking their cars. A low cost reliable ultrasonic ranging device of the type hereinafter described can solve many of these problems.

The Schroeder patent is directed to an anti-collision device for use on a catering vehicle, such as an airport catering truck. The device is adapted to be used in conjunction with a control system for automatically braking the vehicle should collision become imminent. Furthermore, the system has circuitry which provides an audible warning of rising frequency as the vehicle approaches the obstacle, the warning frequency being inversely proportional to the distance from the object. In addition, separate transducers 47 and 47' are employed, increasing the cost of the device.

Likewise, the Hayakawa patent teaches a unit having separate sending and receiving transducers used in conjunction with a wobbler 14 to provide a fail-safe unit.

Additional examples of ultrasonic ranging devices for use in vehicles are disclosed in U.S. Pat. No. 3,806,861 to Okumura et al., which teaches a system requiring an active reflector 20 having both a receiver and a transmitter.

U.S. Pat. No. 3,842,397 to Sindle, which discloses a scheme for employing a plurality of ultrasonic transducers and receivers, all functioning simultaneously.

British patent specification No. 1,509,756 to Mukhin et al. for an ultrasonic vehicle detection device which discloses a clock pulse generator connected to control an oscillator and a switching circuit.

Thus, it is clear that what is needed is a relatively low cost system which can inform the driver through the use of a bell or other tone that the driver is within a predetermined range of an obstacle, whether the vehicle is moving or not.

SUMMARY OF THE INVENTION

An ultrasonic ranging device for use in a vehicle, such as an automobile, is disclosed herein. The unit includes a sequential timer which produces a periodic transmitter gating signal and a periodic range gate signal. The transmitter gating signal is supplied to a low power analog gate and a high power analog gate, the low power analog gate being connected to receive a 23 kilohertz signal produced by a free running astable multivibrator feeding through a low pass filter. The transmitter gating signal simultaneously switches both a low power analog gate and the high power analog gate on to allow the astable multivibrator to feed a power amplifier connected between the analog switches and allow the power amplifier to drive a piezoelectric transducer. Since the transmitter gating signal is supplied periodically, a transducer produces a series of pulsed sonic tones.

The transducer also receives return echoes from nearby objects and converts the return echoes to electrical return signals. The electrical return signals are fed to a tuned receiver which selectively amplifies 23 kilohertz signals. The tuned receiver supplies a signal to a detector, which in turn feeds a logic or coincidence circuit. When a range gate signal is supplied from the sequential timer to the logic circuit while the logic circuit is receiving the detector signal, the logic circuit drives an output indicator, such as a lamp or a buzzer, to warn a user of an obstacle. The duration and timing of the range gate determine the effective range of the unit.

It is a principal object of the present invention to provide a reliable ultrasonic ranging device for use in automobiles.

It is another object of the instant invention to provide an ultrasonic ranging device for use in an automobile wherein a single transducer is used for sending and receiving. It is a further object of the instant invention to provide an ultrasonic ranging device for use in a vehicle which is economical. Further objects of the instant invention will become obvious to one skilled in the art upon a perusal of the specification and claims in light of the accompanying drawings.

BRIEF DESCRIPTION OF THE DRAWINGS

FIG. 2C is a schematic diagram of a third portion of the ultrasonic ranging device.

DESCRIPTION OF THE PREFERRED EMBODIMENT

Figure 1:
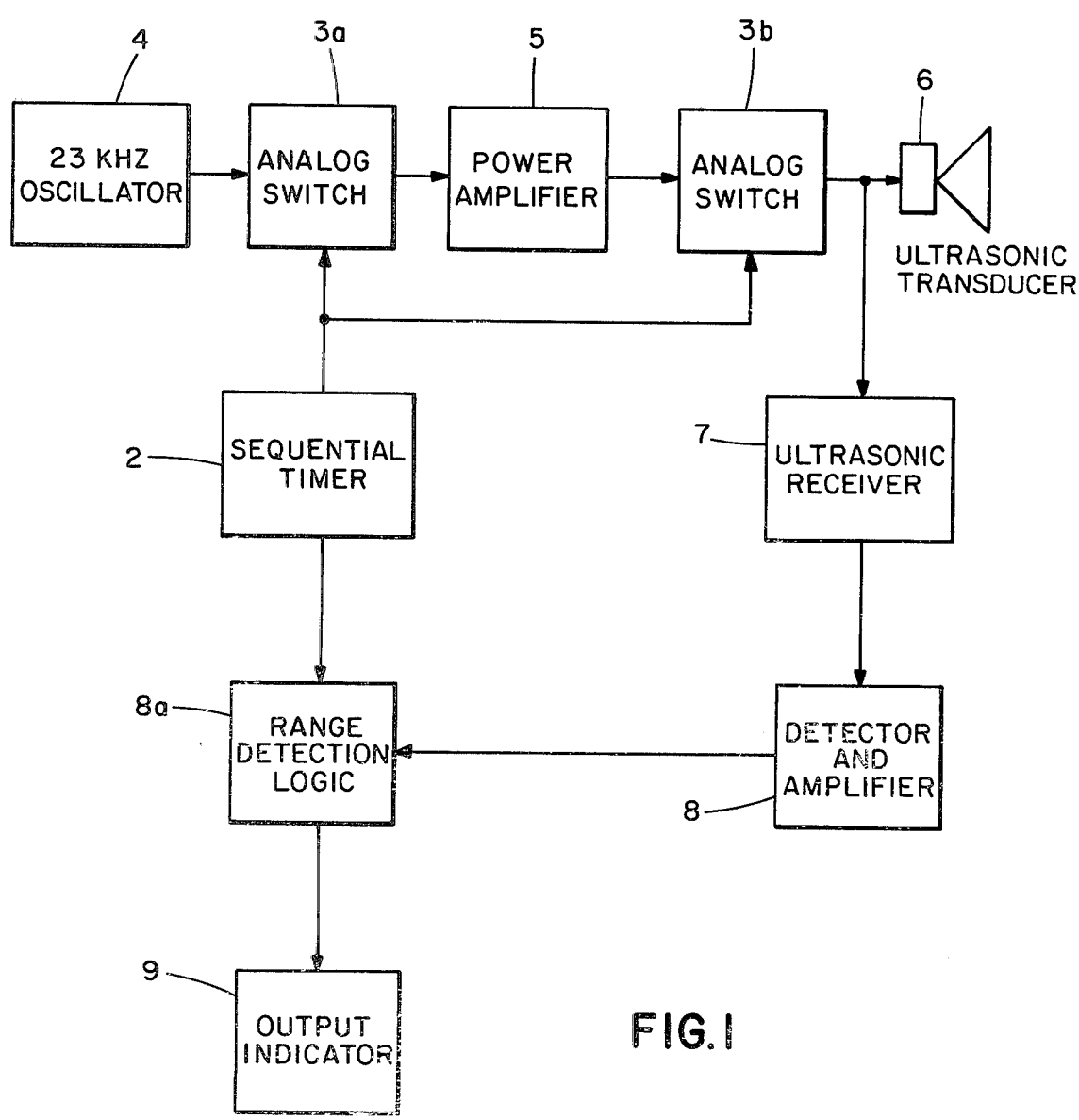
FIG. 1 is a block diagram showing the overall arrangement of the ultrasonic ranging device disclosed herein.

An ultrasonic ranging device 1, shown in the block diagram of FIG. 1, is disclosed herein. Ultrasonic ranging device 1 includes a sequential timer 2 providing timing signals to a pair of transmitter analog switches 3a and 3b, switch 3a controlling an oscillating output from a free running 23 kilohertz osscillator 4 for supply to a power amplifier 5. Analog switch 3b controls supply of an amplified signal from power amplifier 5 to an ultrasonic transducer 6.

Analog switches 3a and 3b provide a pulsed oscillating output. Ultrasonic transducer 6 acts both as a transmitting transducer and as a receiving transducer, which receives echoes from nearby objects. The echo signals are processed by a receiver 7, which supplies a receiver signal to a detector 8. Detector 8 supplies a detector signal to a range detection logic unit 8a, which produces an output driver signal when the detector signal and a range gate signal from sequential timer 2 are coincident. The output driver signal is supplied to a suitable output indicator, such as a buzzer or a lamp 9.

Figure 2A:
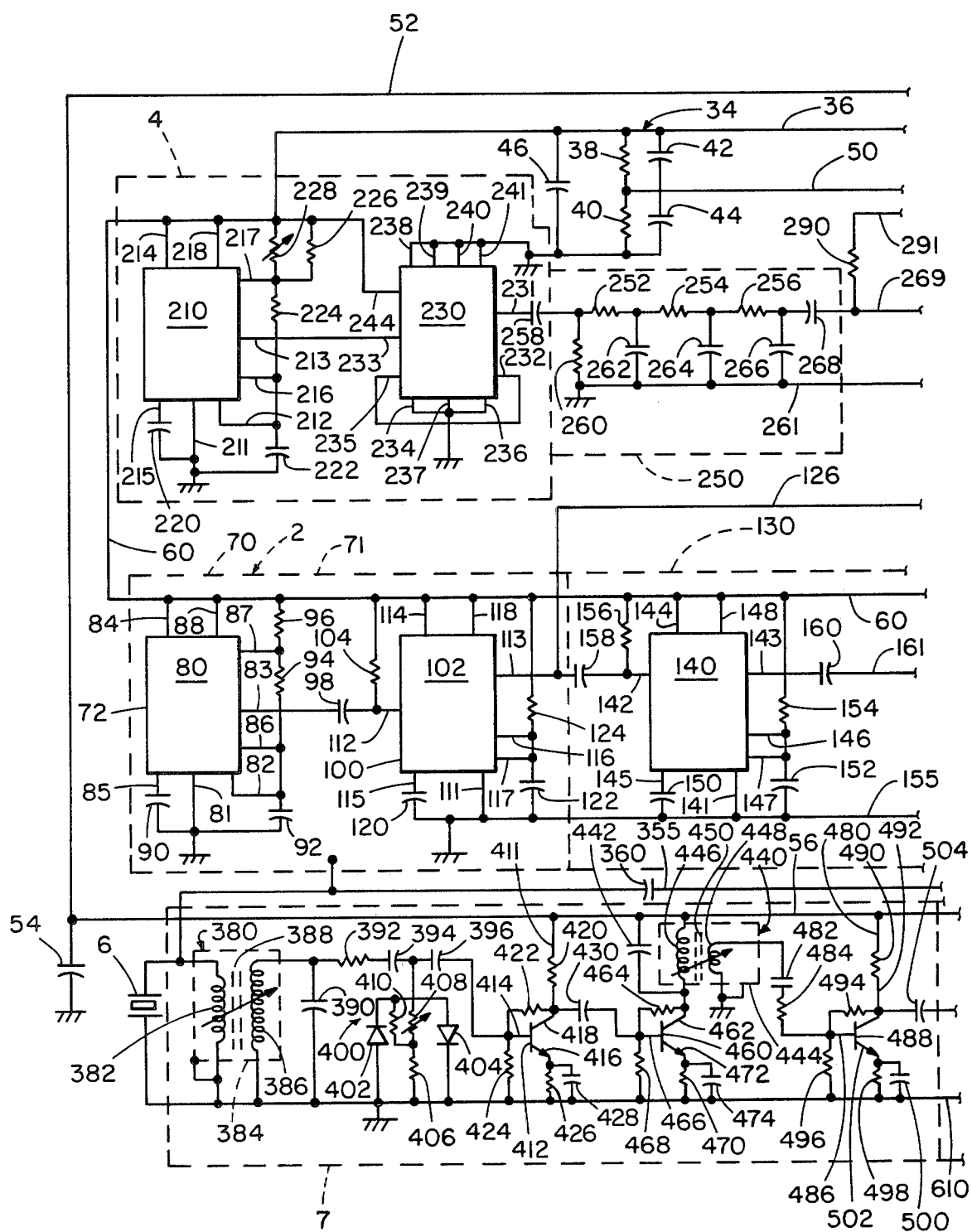
FIG. 2A is a schematic diagram showing details of a first portion of the ultrasonic ranging circuit.
Figure 2B:
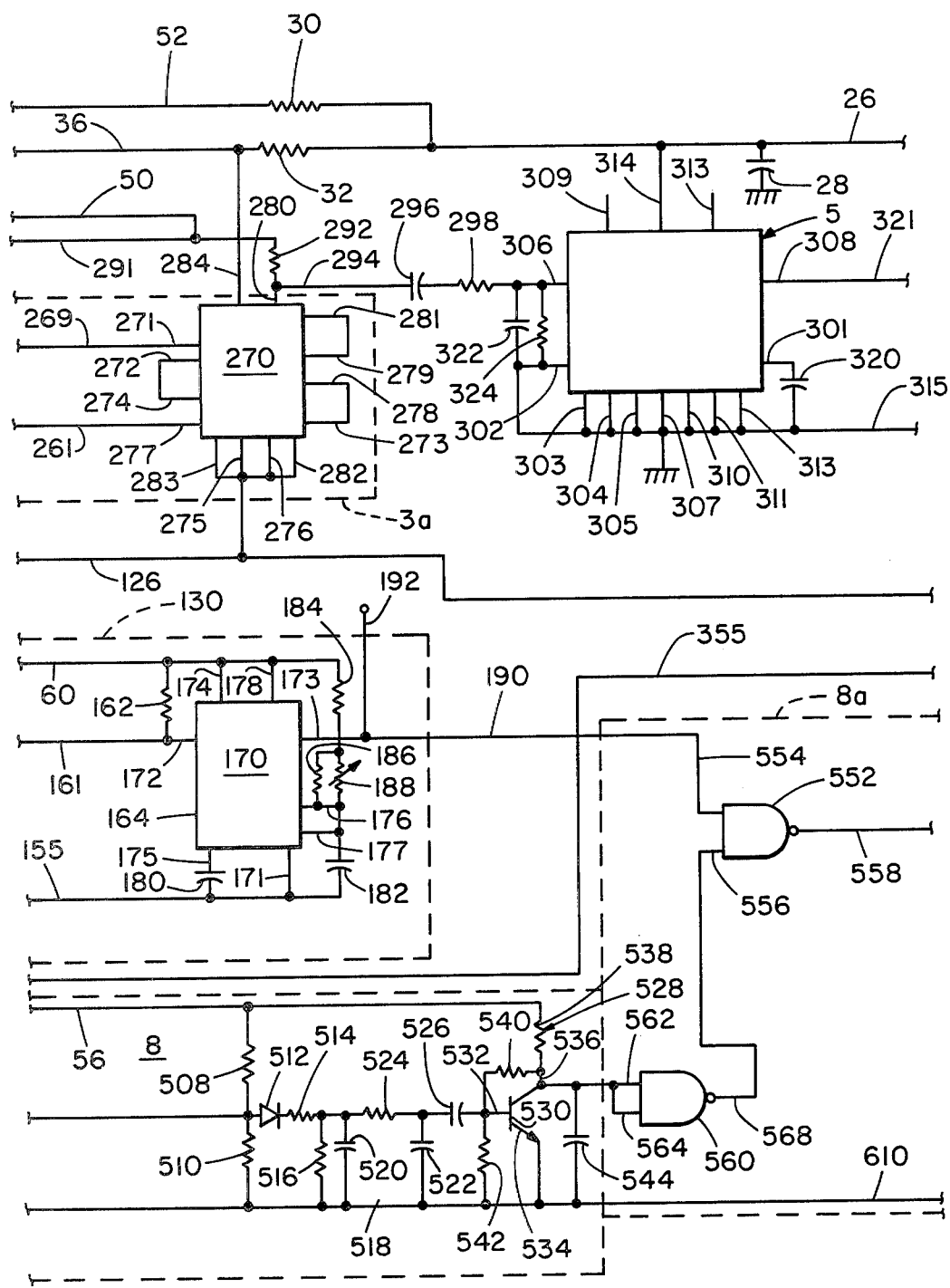
FIG. 2B is a schematic diagram of a second portion of the ultrasonic ranging device.

As shown in FIGS. 2A, 2B, and 2C, a supply 12 having a lead 14 connected to the positive terminal of a 12 volt automotive battery is used herein. A one amp fuse 16 is connected in series in lead 14 and a choke 18 is connected in series with fuse 16 to block conduction of transients or high frequency noise generated in part by the ignition system of the vehicle. A voltage regulator diode 20 is connected in series with choke 18 to further prevent the transmission of the high frequency transients to other portions of the circuit. In this instance, voltage regulator 20 is selected so that it has an avalanche or breakdown voltage of 30 volts. Regulator 20 is connected to a circuit ground 22 and to a second choke 24. Choke 24 is connected to the B− or negative battery supply of the automotive battery. In most vehicles in use in the United States of America, vehicles inductor 24 can be connected to the chassis of the vehicle, since most such vehicles have a negative chassis ground. The regulated 12 volt supply is fed through a lead 26 connected to the junction of choke 18 and zener 20 and is further filtered by a capacitor 28 connected between lead 26 and ground. A pair of identical resistors 30 and 32 is connected to lead 26 to supply various portions of the circuit 10 with suitable power. A voltage divider circuit 34 is connected via a lead 36 to resistor 32.

Voltage divider circuit 34 includes a pair of identical resistors 38 and 40 connected in series as a voltage divider and a pair of capacitors 42 and 44 is connected in parallel with resistors 38 and 40. A large capacitor 46 employed for filtering is connected across resistors 38 and 40, as well as capacitors 42 and 44. A lead 50 is connected to the junction of resistors 38 and 40 and the junction of capacitors 42 and 44 to supply a regulated filtered positive 6 volt DC potential to other portions of the circuit.

Resistor 30 is connected to a lead 52, which is connected in series with a capacitor 54. Capacitor 54 is also connected to ground. An additional power supply lead 56 is connected to the junction of lead 52 and capacitor 54 to supply regulated B+ potential to other portions of the circuit.

Lead 36 is connected to a lead 60, which supplies B+ power to a portion of the circuit.

The clock or sequential timer 2 is driven from power supply lead 60. In order to provide proper gating of transmitter and receiver functions, it is necessary to provide a master clock 2, which includes means for producing a transmitter gating signal 71 and means for producing a receiver gating signal. In order to provide a transmitter gating signal, which must be pulsed a number of times, an astable multivibrator 72 is provided. Astable multivibrator 72 is operated at a frequency of about 10 Hz. in this embodiment. In other words, a transmitter gating signal is produced 10 times each second. A well-known integrated circuit, in this instance, an NE555 integrated circuit timer, identified by numeral 80, is provided. Integrated circuit 80 has a plurality of leads connected thereto. The leads are respectively numbered 81, 82, 83, 84, 85, 86, 87, and 88 and correspond relatively to pins 1, 2, 3, 4, 5, 6, 7, and 8 in the Signetics numbering scheme. Lead 81 is the ground lead. Lead 82 is the trigger lead. Lead 83 is the output lead. Lead 84 is the reset lead. Lead 85 is the control voltage lead. Lead 86 is the threshold lead. Lead 87 is the discharge lead. Lead 88 is the supply voltage lead.

As is well-known to those skilled in the art, reset lead 84 and power supply lead 88 are connected to B+ supply line 60. Ground lead 81 is connected to the circuit ground. A capacitor 90 is connected between control voltage lead 85 and ground lead 81. A capacitor 92 is connected between ground lead 81 and trigger lead 82. Trigger lead 82 and threshold lead 86 are both connected to a resistor 94, which is also connected in series with a capacitor 92. Discharge lead 87 is connected to a junction of resistor 94 and a resistor 96. Resistor 96 is fed from B+ lead 60. As is well-known, the frequency of oscillation of the astable multivibrator 72 is determined by the values of capacitor 92 and resistors 94 and 96. Output lead 83 produces a transmitter timing signal comprised of a rectangular wave having a frequency of 10 Hz. The transmitter timing signal is fed through a differentiating capacitor 98, which converts the rectangular wave signal to a spiking signal having positive spikes in phase with the positive going legs of the rectangular wave signal and negative spikes in phase with the negative going legs of the rectangular wave signal.

The 10 Hz. spike signal is supplied to a delay circuit 100 comprised of an NE555 integrated circuit timer, identified by numeral 102 and configured as a monostable multivibrator. Voltage pull up or bias is provided to the spiking signal by a resistor 104, which is connected to B+ supply lead 60. The level shifted spiking signal is supplied to integrated circuit 102, which has a ground terminal 111, a trigger terminal 112, an output terminal 113, a reset terminal 114, a control voltage terminal 115, a threshold terminal 116, a discharge terminal 117, and a power supply terminal 118. The spiking signal after level shifting is input at trigger terminal 112.

Integrated circuit 102 has a capacitor 120 connected between control voltage terminal 115 and ground terminal 111. Capacitor 120 and ground terminal 111 are connected to circuit ground. A capacitor 122 is connected between ground terminal 111 and discharge terminal 117. Threshold terminal 116 is connected to discharge terminal 117 and is also connected to resistor 124, which is fed from power supply lead 60. Upon receiving each negative going spike from output lead 83 of astable multivibrator 72, monostable multivibrator 100 produces a positive rectangular wave at output lead 113 having a duration of about 500 microseconds.

Therefore, ten equally spaced 500 microsecond duration rectangular wave pulses are produced by monostable multivibrator 100 each second. The 500 microsecond pulses comprise the transmitter gating signal, which is supplied by output lead 113 to a clock lead 126. The transmitter gating signal is supplied to other portions of the ultrasonic ranging circuit for purposes which will become clear hereinafter.

In order to control and measure return echoes from objects which are to be detected, it is necessary that provision be made for some sort of range gating in ultrasonic ranging circuit 10. Clock 2 includes a range gating portion 130, which is connected to a receiver portion of the circuit to provide the range gating function.

For reasons which will become clear hereinafter, range gating portion 130 has a pair of time gating portions, one of which provides a dead zone delay and another of which performs a variable range gating delay function. The dead zone delay function is provided by an integrated circuit 140 comprised of an NE555 integrated circuit timer configured as a monostable multivibrator in a manner substantially identical to the configuration of monostable multivibrator 100. Integrated circuit 140 has a ground terminal 141, a trigger terminal 142, an output terminal 143, a reset terminal 144, a control voltage terminal 145, a threshold terminal 146, a discharge terminal 147, and a supply terminal 148. Reset terminal 144 and supply terminal 148 are fed from B+ supply line 60. Ground terminal 141 is connected to ground. Control voltage terminal 145 is connected through a capacitor 150 to ground. Threshold terminal 146 and discharge terminal 147 are connected together to a junction of grounded capacitor 152 and a resistor 154, which is fed from B+ supply line 60. Capacitor 152 is connected to a ground lead 155. A bias or pull up resistor 156 supplies DC potential to trigger terminal 142. The transmitter gating signal produced at output terminal 113 is fed through a differentiator capacitor 158 to the junction of resistor 156 and trigger terminal 142. In the process, the 500 microsecond duration rectangular wave pulses are differentiated to produce positive spikes corresponding to the positive going portions of the 500 microsecond rectangular pulses and negative pulses corresponding to the negative going portions of the 500 microsecond duration rectangular waves.

The pulses are level shifted by the bias supplied through resistor 156. Integrated circuit 140, as is well-known in the art, triggers on each of the negative spikes, which are supplied to trigger terminal 142. Thus, dead zone timer 140 is enabled at the end of each 500 microsecond rectangular pulse and as will be set forth hereinafter, dead zone timer 140 is started as the transmitter is shut off. Dead zone timer 140 produces a rectangular wave signal having a frequency of 10 Hz. and a duration of about 1.5 milliseconds.

In effect, dead zone timer 140 is employed as a delay circuit, for reasons which will hereinafter become apparent. The dead zone delay signal supplied from output terminal 143 is differentiated by a capacitor 160 connected to output terminal 143 and supplied to a lead 161. Again, the rectangular wave is converted to a spiking signal with the negative spikes occurring ten times a second and phase shifted about two milliseconds with respect to the timing signal produced by astable multivibrator 72. The spiking signal is level shifted by potential supplied through a resistor 162 from B+ supply line 60.

The level shifted spiking signal is fed to a range gate circuit 164, which is comprised of an NE555 integrated circuit timer, identified by numeral 170. Integrated circuit 170 has a ground terminal 171, a trigger terminal 172, an output terminal 173, a reset terminal 174, a control voltage terminal 175, a threshold terminal 176, a discharge terminal 177, and a power supply terminal 178. Power supply terminal 178 and reset terminal 174 are fed from B+ supply line 60. A capacitor 180 is connected between control voltage terminal 175 and circuit ground lead 155. Ground terminal 171 is connected to circuit ground. A capacitor 182 is connected between discharge terminal 177 and ground terminal 171. A resistor 184 is connected to power supply line 60. A fixed resistor 186 is connected to resistor 184. A variable resistor 188 is connected in parallel with fixed resistor 186. Fixed resistor 186 and variable resistor 188 are both connected to threshold terminal 176 and discharge terminal 177. The overall circuit configuration of monostable multivibrator range gate 164 is known to those skilled in the art.

Monostable multivibrator 164 produces a rectangular wave pulse ten times each second in response to the triggering pulses supplied from dead zone timer 140. The duration of each rectangular wave pulse is approximately 40 milliseconds and is adjustable by adjustment of variable resistor 188. The time duration of each range gate pulse determines the effective range over which the ultrasonic ranging device may be operated, as will become clear hereinafter. The rectangular range gate pulses comprise the receiver timing signal and are supplied by output terminal 173 to a receiver timing lead 190. A test point lead 192 is connected to lead 190 for purposes of testing the timer circuit.

Timer 70 then produces a 10 hertz rectangular wave signal in integrated circuit 80, which times monostable multivibrator 100 to produce a 10 hertz rectangular wave, each rectangular section having a duration of 500 microseconds. The 500 microsecond rectangular waves are supplied to a transmission portion of the circuit. The range gate circuit 130 produces a rectangular wave signal, which is delayed 1.5 milliseconds after the termination of each transmitter pulse by the dead zone monostable 140.

Oscillator 4 is provided to produce a high frequency electrical signal for conversion to ultrasonic sound. In order to provide an inexpensive yet accurate oscillator, an NE555 integrated circuit timer generally identified by numeral 210 is employed. Integrated circuit 210 has a ground lead 211, a trigger lead 212, an output lead 213, a reset lead 214, a control voltage lead 215, a threshold lead 216, a discharge lead 217 and a power supply lead 218. Power supply lead 218 and reset lead 214 are supplied with B+ power from lead 36. Control voltage terminal 215 is connected through a capacitor 220 to circuit ground. Ground terminal 211 is also connected to circuit ground. Trigger terminal 212 is connected through a capacitor 222 to ground. Threshold terminal 216 is connected to trigger terminal 212. A resistor 224 is connected to threshold terminal 216. A fixed resistor 226 is connected between resistor 224 and the B+ supply lead 36. A variable resistor 228, which is comprised of a trimmer potentiometer, is connected in parallel with resistor 226. Integrated circuit 210 is configured in a manner well-known to those skilled in the art as an astable multivibrator. In this instance, astable multivibrator 210 produces a rectangular wave signal having a frequency of 46 kHz. at output terminal 213. The 46 kHz. signal may be adjusted in frequency by trimpot 228. The adjustment is performed at the factory to insure that the desired 46 kHz. basic clock frequency is generated.

The 46 kHz. signal is fed to a divide-by-two circuit comprised of an integrated circuit 230, which in this embodiment is a CD 4013 Dual D FLip-Flop having an output Q1 terminal 231, a $\overline{Q}1$ terminal 232, a clock 1 terminal 233, a grounded reset 1 terminal 234, a data 1 terminal 235 connected to $\overline{Q}1$ terminal 232, a set 1 terminal 236 and a VSS terminal 237 connected to ground with reset 1 terminal 234. A set 2 terminal 238, a data 2 terminal 239, a reset 2 terminal 240 and a clock 2 terminal 241 are connected to ground and to electrolytic capacitor 46. A power supply VDD terminal 244 is also provided. Power supply terminal 244 receives B+ power from lead 36. The 46 kHz. rectangular wave is supplied to clock terminal 233 of divide-by-two circuit 230. A 23 kHz. square wave signal is output from divide-by-two circuit 230 at Q1 terminal 231. For reasons which will become apparent later, it is necessary to insure that the 23 kHz. signal contains little or no high frequency transients. In order to remove the high frequency transients or components from the 23 kHz. rectangular wave signal a low pass filter 250 is provided.

As is well known to those skilled in the art, a rectangular or square wave signal can be "built up" or duplicated by the addition of sine and cosine waves of different integer multiple frequencies by the method of Fourier analysis. In this instance, the primary Fourier component of the 23 kHz. signal is a 23 kHz sine wave. Higher frequency sine waves are also superposed upon the basic 23 kHz sine wave signal to yield the rectangular wave. Low pass filter 250 removes substantially all of the sine wave components having a frequency higher than 23 kHz.

Low pass filter 250 is a conventional filter having a plurality of series connected identical resistances 252, 254, and 256. Resistor 252 is fed through a capacitor 258. A resistor 260 is connected between the junction of resistor 252 and capacitor 258 and a ground lead 261. A capacitor 262 is connected between the junctions of resistors 252 and 254 and ground. A capacitor 264 is connected between the junctions of resistors of 254 and 256 and ground. A capacitor 266 is connected between resistor 256 and ground. An output capacitor 268 supplies a substantially sinusoidal signal having a frequency of 23 kHz. through a lead 269 to a low power analog gate or switch 270.

Analog gate 270 is comprised of an integrated circuit. In this embodiment a CD 4016 Quad Bilateral Switch is used. Analog gate 270 is composed of four internal gates. Analog gate 270 controls transmission of the 23 kHz. sine wave, which is being continuously generated, to other portions of the circuit. Since solid state gating circuits do not have the range of impedance found in a mechanical switch or relay, the four gates within integrated circuit 270 have been connected in series to provide the maximum impedance available in this embodiment.

Low power analog gate 270 has a plurality of respective input terminals 271, 274, 278 and 281 and a plurality of respective output terminals 272, 273, 279 and 280 for each of the four internal gates. A plurality of control terminals 283, 275, 276 and 282 control the respective internal gates. Control terminals 275, 276, 282 and 283 are connected in parallel to lead 126 to receive the transmitter gating control signal. Lead 269 feeds input gate 218, which is connected in series to a second gate from its output terminal 272 to input terminal 274. Output terminal 273 is connected to input terminal 278. Output terminal 279 is connected to input terminal 281. Output terminal 280 is connected to a resistor 292 which is connected by leas 50 and 291 to voltage divider 34. A power supply terminal 284 is connected to lead 32.

It is apparent that the series connection of the power terminals for the four gates provides the maximum blocking impedance to the 23 kHz. oscillator signal received at line 269 from the low pass filter.

An output lead 294 is connected to output terminal 280 and resistor 292. In order to ensure that the 23 kHz. sine wave signal is not distorted by analog gate 270, resistors 290 and 292 DC bias the input terminal 281 and output terminal 280 at one half supply voltage.

As was mentioned above, in this embodiment at 1/10th second intervals 500 microsecond duration rectangular wave pulses are supplied by lead 126 to low power analog gate 270. During the time that each of these pulses is received, all four internal gates open or simultaneously switch to a conducting state allowing a 500 microsecond duration burst of 23 kHz. sine wave to be transmitted to output lead 294. Thus, ten equally spaced 500 microsecond duration bursts of 23 kHz. sine wave signal is output at lead 294.

The sine wave bursts are AC coupled through a capacitor 296 and resistor 298 to a power amplifier 5.

Power amplifier 5 is in this embodiment a semiconductor LM380N integrated circuit, generally identified by numeral 300, having a plurality of terminals identified by numerals 301, 302, 303, 304, 305, 306, 307, 308, 309, 310, 311, 312, 313, and 314 corresponding respectively to terminals 1 through 14 in the National Semiconductor numbering system. Terminal 314 is connected to B+ supply line 26. Terminals 309 and 313 are left floating. Ground terminals 303, 304, 307, 310, 311 and 312 are connected to a grounded lead 315. Bypass terminal 301 is connected through a capacitor 320 to grounded lead 315. The sine wave bursts are supplied from resistor 298 to inverting input terminal 306. An output lead 321 is connected to output terminal 308. A capacitor 322 and a resistor 324 are connected in parallel between inverting input terminal 306 and noninverting input terminal 302. Noninverting terminal 302 is also connected to ground. Capacitor 322 removes high frequency transients which may be present at the beginning or end of the sine wave bursts due to switching of the low power analog gate 270. Power amplifier 300 increases the amplitude of the sine wave bursts and produces an output sine wave signal having a 23 kHz. frequency with a 7-volt peak-to-peak potential. Transients are conducted to ground through a filter comprised of a resistor 328 and a capacitor 329 connected in series between output lead 321 and grounded lead 315.

An AC coupling capacitor 332 having a bias resistor 334 connected between it and ground supplies the 23 kHz. sine wave to the high power analog gate or switch 3b comprised of a triac 342. Triac 342 is connected at a gate 344 through a resistor 345 to lead 126 to receive the transmitter gating signal. A first main terminal 346 of triac 342 is connected to capacitor 332 to receive the amplified 23 kHz. signal burst. A second main terminal 348 of triac 342 is connected to a transformer 350 at a primary winding 352. A secondary winding 354 of transformer 350 is connected to primary winding 352 and to a lead 355. At the same time that the 500 microsecond rectangular wave switches analog gate 270 conducting, triac 342 is also switched conducting to allow the amplified sine wave burst to be boosted through the transformer 350 to an amplitude of 43 volts peak-to-peak. The 43 volt peak-to-peak signal is fed through lead 355 and AC coupled through a capacitor 360 to the piezoelectric transducer 6. Piezoelectric transducer 6 is in this embodiment mounted in the rear bumper of an automobile, although it may be appreciated that transducer 6 may be mounted at other portions of the automobile in other embodiments. Transducer 6 generates a 500 microsecond duration tone burst having a 23 kHz. frequency ten times a second in response to the 43 volt peak-to-peak signal supplied through coupling capacitor 360.

Low power analog gate 3a and high power analog gate 3b are employed in the instant circuit to overcome some of the drawbacks which are encountered when using solid state switches. Since the receiver 7 is connected directly to the transducer 6, undesired signal leakage from the oscillator 4 to the transducer 6 should be avoided. Signal transmission should only occur during each 500 microsecond duration gating signal supplied by timer 71. High power gate 3b blocks almost all of the signal which might be supplied to transformer 350. However, since the signal does have a relatively high frequency, false triggering of the triac might occur if the signal was being fed from the power amplifier 5 to the triac 342 at all times. In order to minimize if not prevent signal transmission through the power amplifier, low power gate 3a is also employed to block the oscillating signal from transmission to power amplifier 5 when the rectangular wave signal is not present on lead 126.

It can be appreciated then that the combination of both low power analog gate 3a and high power analog gate 3b provide for very rapid and positive switching of the transmission signal.

After each tone burst is generated by transducer 6, nearby objects will reflect the ultrasonic bursts back to transducer 6. The echoes or return sounds cause transducer 6 to generate a 23 kHz. return electrical signal.

The use of only one transducer in the present embodiment provides several economies to the user. At the outset, it is clear that the user need only pay for one transducer. This, of course, reduces the equipment cost which the user must pay. In addition, since the transducer is usually mounted in the bumper of a vehicle, or is sometimes mounted on a sheet metal portion of a vehicle, the necessity of mounting only one transducer rather than two or more and the elimination of the necessity of alignment of a transmitting transducer with respect to a receiving transducer also lowers the cost which the ultimate user must pay for the unit.

The electrical return signal is supplied from transducer 6 to receiver 7 which includes a shielded transformer 380. The return signal is fed to a primary winding 382. Primary winding 382 is also grounded and is connected to a shield 384. A secondary winding 386 is also connected to ground and is inductably coupled to primary winding 382 in part through a variable slug 388. A capacitor 390 is connected across secondary winding 386 to complete a tuned circuit with transformer 380. The tuned circuit is factory preset to a frequency of 23 kHz. by adjustment of slug 388. The tuned circuit is employed to exclude extraneous noise from the receiver 7 which may be picked up by transducer 6 and could give a false return indication. The tuned return signal is then supplied to a resistor 392 connected to capacitor 390. A pair of capacitors 394 and 396 is connected in series with resistor 392.

A clipping circuit 400 is connected to the junction of capacitors 394 and 396 and is also connected to ground. Clipping circuit 400 is required because the 43-volt transmission signal supplied to transducer 370 is also at least partially supplied to receiver 7 since receiver 7 is connected at all times to transducer 6. In order to prevent damage to receiver 7 and to prevent false return indications due to the high voltage transmitting signal, clipper circuit 400 conducts to ground all signals having an amplitude exceeding either plus or minus 0.7 volts. The clipping is achieved by a pair of oppositely poled diodes 402 and 404 which are connected in parallel with each other to ground. A fixed resistor 406 is connected to ground in parallel with diodes 402 and 404. A variable resistor 408 is connected in series with fixed resistor 406. A fixed resistor 410 is connected in parallel with variable resistor 408. The clipping amplitude can be factory-set by adjustment of variable resistor 408.

The clipped 23 kHz. signal is supplied through capacitor 396 to a first amplifier stage 411. It may be appreciated that electrical return signals generated by the transducer 6 in response to echo returns have an amplitude a great deal less than 0.7 volts. Thus, the electrical return signals indicative of echo returns are not clipped. First amplifier stage 411 includes a transistor 412 having a base 414, an emitter 416 and a collector 418, which is connected through a resistor 420 to B+ supply line 56. A collector to base bias resistor 422 is connected between collector 418 and base 414. A resistor 424 is connected between base 414 and ground. A resistor 426 and a parallel filtering capacitor 428 are connected between emitter 416 and ground. Base 414 receives the return signal for amplification. The amplified signal is filtered by capacitor 428 which conducts high frequency transients to ground. The amplified filtered signal is AC coupled through a capacitor 430 connected to collector 418. The AC coupled amplified signal is fed to a tuned amplification stage 440. Rejection of frequency other than the desired 23 Hz. frequency is provided by a capacitor 442 connected to the B+ supply and to a step down transformer 444 having a primary winding 446 and a secondary winding 448. The combination of capacitor 442 and transformer 444 is tuned at the factory by adjustment of a movable slug 450. Capacitor 442 and transformer 444 comprise a tank circuit tuned to 23 kHz. Primary winding 446 and capacitor 442 are connected between B+ supply line 56 and a transistor 460 at a collector 462 of transistor 460. A collector base bias resistor 464 is connected between collector 462 and a base lead 466 of transistor 460. A resistor 468 is connected between base 466 and ground. A resistor 470 is connected between an emitter 472 of transistor 460 and ground in parallel with a filter capacitor 474. The level shifted amplified signal supplied through coupling capacitor 430 is fed to base 466 of transistor 460 where the signal is amplified, the amplified signal is filtered by capacitor 474 and additional tuning or filtering is performed by the combination of capacitor 442 and transformer 444. The tuned amplified signal is output coupled through secondary winding 448 of transformer 444.

Final amplification is provided in receiver 7 by a final stage 480 which is AC coupled to output winding 448 through a capacitor 482 and a resistor 484. The AC coupled signal is supplied to a base 486 of a transistor 488. Transistor 488 is biased in the linear region by a resistor 490 connected from a collector 492 to the power supply line 56. A collector to base biasing resistor 494 is connected between collector 492 and base 486. A resistor 496 is connected between base 486 and ground. A resistor 498 and a parallel capacitor 500 are connected between ground and an emitter 502. The 23 kHz. signal, AC coupled to base 486, is amplified by transistor 488, filtered by capacitor 500, and AC coupled through a capacitor 504 to detector stage 8.

Detector 8 has a pair of input bias resistors 508 and 510 connected in series as a voltage divider to supply a DC bias voltage for addition with the amplified 23 kHz. return signal supplied from capacitor 504. The return signal is rectified by a diode 512 connected to the junction of capacitor 504, resistor 508 and resistor 510. Rectified voltage supplied by diode 512 is supplied to a voltage divider comprised of resistor 514 and a resistor 516. The junction of resistors 514 and 516 is connected to a filter 518 comprised of a pair of parallel connected ground capacitors 520 and 522 bridged by a resistor 524. Filter 518 removes remaining high frequency components from the half wave rectified signal supplied through diode 512. The filtered detector signal is AC coupled through a capacitor 526 to an amplifier stage 528, which is comprised of a transistor 530 having a base 532, an emitter 534 and a collector 536. A bias resistor 538 connects collector 536 to B+ supply line 56. A resistor 540 is connected between base 532 and collector 536. A resistor 542 is connected between base 532 and ground. A filter capacitor 544 is connected from collector 536 to ground. Amplifier stage 528 linearly amplifies the half wave rectified 23 khz. return signal and after filtering through capacitor 544 supplies the amplified detector signal to the range detection logic circuit 8a.

In order to determine whether a particular 23 kHz. return signal is the result of an object in proximity with the transducer 6, it is necessary to provide means whereby the travel time of the tone burst from transducer 6 to the object and back to the transducer may be measured or quantified. In the present embodiment, the combination of the range detection logic 8a as controlled by the range gate signal supplied from lead 190 of clock 70 performs this function. The range gate signal, as was mentioned above, is comprised of a 10 Hz. rectangular wave, each high amplitude portion thereof being phase locked with the 500 microsecond transmission gating signal so that, in this embodiment, the range detection logic will activate output indicator 9 when an obstacle is within not more than 30 feet from the transducer and not less than one foot from the transducer.

The dead zone timer 140 provides an initial time shift of 1.5 milliseconds from the termination of transmission of tone burst. The dead zone period is necessitated because the transducer 6 is used both for transmission and reception of tone burst signals. It may be appreciated that when analog gate 36 switches off, although the signal from power amplifier 5 is interrupted, a residual decaying exponential high frequency vibration will be present in transducer 6. In other words, transducer 6 will continue to "ring" for a short period of time after the transmission power is cut off. In order to prevent the ringing signal from being inadvertently processed as a return echo, dead zone timer 140 time shifts range gate signal on lead 190 1.5 milliseconds away from each 500 microsecond transmission timing signal.

Range gate timer 130 then produces a rectangular range gate signal, which is supplied to a NAND gate 552 of range detector logic 8a at an input terminal 554. The potential at input terminal 554 remains high as long as the range gate rectangular wave remains at a high amplitude. If, while the range gate signal is at a high amplitude, the detector signal is fed to a NAND gate 560 having input terminals 562 and 564 connected together so that the high detector signal is inverted by NAND gate 560, a positive signal will be output at terminal 568 of NAND gate 560 and is supplied to input terminal 556 of gate 552. Thus, when both the range gate voltage goes high and a detector signal is present, a low potential is output from terminal 558 of gate 552. The low voltage signal is fed to a NAND gate 570 having a pair of input terminals 572 and 574 connected in parallel to cause gate 570 to function as an inverter. When the lower voltage enabling signal from gate 552 is supplied to gate 570, an output terminal 576 of gate 570 is driven high.

A test point terminal 578 is connected to output terminal 576 for calibration and testing of the circuit. A blocking diode 580 and a resistor 582 are also connected to output terminal 576. A filter network comprised of a capacitor 584 and a parallel resistor 586 are connected between resistor 582 and ground. The signal from gate 570 is supplied to a NAND gate 588 having a pair of input terminals 590 and 592 connected in parallel, as well as an output terminal 594. Gate 588 acts as an inverter and its output polarity is opposite the output polarity of gate 570 and similar to the output polarity of gate 552. A final NAND gate 596, also configured as an inverter with a pair of input terminals 597 and 598 connected in parallel, receives a signal from terminal 594 and inverts it to produce a logic output signal at an output terminal 599.

In summary, when the range gate voltage goes high and a detector signal is present, thereby indicating that the return signal is representative of an echo from an object located between it and 30 feet from the transducer, output terminal 599 of the range detection logic circuit 590 is driven high and switches on output indicator 9, in this instance, comprised of a buzzer 602 and a parallel lamp 604, thereby allowing power to flow from a lead 606 connected to lead 26 through output indicator 9 to a lead 610 connected to ground.

It may be appreciated that the ultrasonic ranging circuit 1 is an economical distance measuring device particularly well suited for use in vehicles. The use of only a single transducer 6 allows the unit to be inexpensively installed within a particular vehicle. Wide spread use of 555 timers for timing and oscillating functions adds further to the economies of the circuit. The combination of free running astable multivibrator 210 and low pass filter 250 provides a well regulated source of 23 kHz. sine waves without the necessity of using relatively expensive audio oscillators or a crystal controlled oscillator. Gates 3a and 3b positioned respectively on the input and output sides of power amplifier 5, provide rapid and accurate switching of the 23 kHz. sine wave signal for pulsing the ultrasonic transducer 6. Further, in the interests of economy, no switching circuits are provided between ultrasonic receiver 7 and transducer 6, allowing receiver 7 to be connected at all times to transducer 6. Clipping circuit 400 prevents damage to receiver 7 when transmission signal leakage is fed through receiver 7.

Clock or sequential timer 2 has four 555 timers to provide accurate timing control for the 500 microsecond transmission pulses and for the range detection logic 8a.

Althrough the preferred embodiment is directed to an ultrasonic ranging device for use in automobile, it may be appreciated that ultrasonic ranging device 1 can be used in a wide variety of applications, for instance, the ranging device can be used as a back up warning device for a semi-trailer truck or as a collision warning device for construction equipment.

While a single emboodiment of the present invention has been shown and described, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. An ultrasonic ranging device for use in a vehicle comprising: means for producing a continuous time varying oscillating signal, means for switching said oscillating signal, means for amplifying said time varying signal received from said switch means, second switch means connected to said amplifying means to control said amplified oscillating signal, transducer means connected to said second switch means mounted on an external portion of a vehicle and converting said amplified oscillating signal to a high frequency sound, timer means connected to said first and second switch means to control said switch means, receiver means connected to said transducer means to amplify electrical signals received from said transducer, control means connected to said timer means and said receiver means to selectively supply an output signal to output indicating means in response to a timing signal from said timer means and a receiver signal from said receiver when said return signal is received within predetermined maximum and minimum time intervals corresponding to a predetermined distance between said transducer means and an object reflecting said high frequency sound.

2. An ultrasonic ranging device for use in vehicles comprising: sequential timer means for generating a plurality of timing signals, oscillator means producing a continuous oscillating electrical signal, first gating means connected to said timer means and receiving said oscillating electrical signal from said oscillator means to control the flow thereof in response to a first timing signal of said plurality of timing signals, amplifier means connected to said first gating means to receive said oscillating electrical signal therefrom when said gating means are switched on by said first timing signal, said amplifier increasing the amplitude of said oscillating electrical signal, second gating means connected to said amplifier means to said amplified oscillating electrical signal therefrom and to conduct said oscillating electrical signal therethrough in response to said first timing signal supplied by said timer means, transducer means connected to said second gating means for receipt of said amplified oscillating electrical signal therefrom to convert said amplified oscillating electrical signal to a high frequency sound pulse, said transducer means generating a return signal upon receipt of an echo of said high frequency sound pulse reflected from an obstacle, receiver means connected to said transducer means to amplify said return signal, coincidence logic means connect to said sequential timer means for receipt of a second timing signal therefrom and connected to said receiver means for recepit of said amplified return signal, said coincidence logic means providing a coincidence signal when simultaneously enabled by said second timer signal and by receipt of said return signal from said receiver means, and output indicating means connected to said coincidence logic means for receipt of said coincidence signal therefrom providing an output indication in response thereto.

3. The ultrasonic ranging device of claim 2 wherein said oscillator means is a free running astable multivibrator producing a high frequency rectangular wave.

4. The ultrasonic ranging device of claim 3 further including a low pass filter connected to said free running astable multivibrator for conversion of said high frequency rectangular wave generated by said astable multivibrator to a sine wave.

5. The ultrasonic ranging device of claims 2 or 4 wherein said receiver means includes a clipping circuit to prevent said receiver means from being damaged by receipt of the amplified oscillating electrical signal.

6. An ultrasonic ranging device comprising a sequential timer producing a periodic transmission gating signal and a periodic range gating signal following said transmission gating signal, a free running astable multivibrator producing a high frequency rectangular wave, a bistable multivibrator connected to said astable multivibrator prooducing a rectangular wave having one-half the frequency of the astable multivibrator rectangular wave, a low pass filter receiving the bistable multivibrator rectangular wave and converting it to a sine wave of the same frequency, a low power analog gate connected to said low pass filter and being controlled by said transmission gating signal from said sequential timer to produce a pulsed sine wave, a power amplifier connected to said low power analog gate to receive and amplify said pulsed sine wave when said low power gate is enabled by said transmission gating signal, a high power analog gate connected to said power amplifier to receive said smplified pulsed sine wave signal, said high power analog gate being enabled simultaneously with said low power analog gate by said transmission gating signal, a transducer connected to said high power analog gate and producing a series of high frequency sound pulses in response to said pulsed amplified sine wave and also producing electrical return signals when said transducer receives an echo of said high frequency sound pulses from a nearby object, a receiver connected to said transducer for receipt of said electrical return signal and having a clipper circuit to prevent damage to the receiver from said amplified pulsed sine wave signal and further including a tuned stage for rejection of all frequencies except the frequency of the amplified pulsed sine wave, a half wave detector connected to said receiver and producing an amplified detector signal in response to said electrical return signal, a coincidence logic circuit connected to said detector and said sequential timer and producing an output driving signal when said range gate signal and said detector signal are in coincidence and an output indicator providing an output indication to a user upon receipt of said output driving signal.

* * * * *